United States Patent [19]

Johnston

[11] 4,251,314

[45] Feb. 17, 1981

[54] HEAT BONDING DEVICE

[76] Inventor: Orin B. Johnston, 5548 W. 78th St., Edina, Minn. 55435

[21] Appl. No.: 73,148

[22] Filed: Sep. 6, 1979

Related U.S. Application Data

[63] Continuation-in-part of Ser. No. 827,668, Aug. 25, 1977, abandoned, which is a continuation-in-part of Ser. No. 697,746, Jun. 21, 1976, abandoned, which is a continuation of Ser. No. 499,449, Aug. 22, 1974, Pat. No. 3,964,958, which is a continuation-in-part of Ser. No. 326,534, Jan. 24, 1973, abandoned.

[51] Int. Cl.³ .............................................. B30B 9/22
[52] U.S. Cl. ........................... 156/583.1; 100/93 P; 100/211; 100/296; 156/272; 156/275; 156/285; 156/380; 156/382
[58] Field of Search ............... 156/228, 272, 285, 286, 156/288, 380, 381, 382, 498, 580, 583; 100/93 P, 211, 212, 295, 296, 297; 219/243, 541, 548, 549; 425/405, 407, 408, 411, 420

[56] References Cited

U.S. PATENT DOCUMENTS

| | | | |
|---|---|---|---|
| 2,714,416 | 8/1955 | Fever | 156/583 |
| 3,031,739 | 1/1962 | Boggs | 156/275 |
| 3,049,465 | 8/1962 | Wilkins | 156/275 |
| 3,071,503 | 1/1963 | Dubois | 156/272 |
| 3,133,846 | 5/1964 | Gandy | 219/243 |
| 3,480,505 | 11/1969 | Donnell et al. | 219/243 |
| 3,630,396 | 3/1953 | Langer | 219/243 |
| 3,875,373 | 4/1975 | Lavey et al. | 219/549 |
| 3,996,091 | 12/1976 | Daunt et al. | 156/285 |

FOREIGN PATENT DOCUMENTS 1026223  4/1966  United Kingdom ..................... 156/275

Primary Examiner—Caleb Weston
Attorney, Agent, or Firm—William R. Hulbert

[57] ABSTRACT

Apparatus for bonding heat bondable materials through the application of pressure and heat employs a diaphragm pressed by fluid pressure against the materials. The diaphragm comprises a web having a flexible heating element bonded to its non-material pressing side and has a configuration corresponding to the desired seam configuration. An improved heating element configuration is disclosed to reduce the forces tending to separate the element from the web as a result of their different coefficients of expansion and provision is made fo facilitate electrical connection to the heating element while reducing unwanted effects on the heat pattern.

3 Claims, 4 Drawing Figures

4,251,314

HEAT BONDING DEVICE

CROSS REFERENCE TO RELATED APPLICATIONS:

This is a continuation-in-part of application Ser. No. 827,668, filed Aug. 25, 1977, abandoned, in turn a continuation-in-part of application Ser. No. 697,746 abandoned, filed June 21, 1976, which is a continuation of application Ser. No. 499,449, filed Aug. 22, 1974, now U.S. Pat. No. 3,964,958, issued June 22, 1976, which is a continuation-in-part of application Ser. No. 326,534, filed Jan. 24, 1973, now abandoned.

BACKGROUND OF THE INVENTION

The use of a diaphragm, formed of a flexible web carrying a heating element for the application of pressure and heat to bond heat bondable material is disclosed in my U.S. Pat. No. 3,964,958, issued June 22, 1976, which is hereby incorporated by reference and hereinafter referred to as "said patent".

In said patent, a pressure chamber is formed by a cavity closed by a diaphragm. The materials to be bonded are supported on a supporting surface and the diaphragm is brought into contact with the materials over an area larger than the intended bond area by flexing the same convexly by regulated pressure applied by fluid in the pressure chamber. A heating element is carried by the diaphragm inside the pressure chamber cavity, on the non-material engaging side thereof, to apply bonding heat to the materials through the diaphragm. The configuration of the heating element defines the bonding configuration.

The system of said patent eliminates extrusion of the bond area which is inherent in typical die bonding systems. The strength of the bond approaches that of the material itself. The heating element employed is preferably a thin ribbon bonded to the web and is compatible with those bonding techniques known as resistance and impulse bonding, as well as that variously known as dielectric, electronic, high frequency or radio bonding.

In implementing the invention of said patent, it has been discovered that some applications may require a more precise heat control in the bond area and adjacent areas. For example, while a complete bond having the strength of the material in which it is formed is easily accomplished with the system of said patent, a more precise heat control will allow the strength of that bond to be more readily controlled so as to provide bonds that will pull apart with a predetermined force less than the strength of the materials. Such a bond is desirable in many packaging applications. Additionally, by precisely controlling the temperature in the bond area and adjacent areas, the bond width is precisely controlled and is affected very little by the duration of heat application. Also, it has been found that making electrical contact with the heating element at a point where it is bonded to the web increases the mass of the heated components at that location and alters the heat pattern that would otherwise to produced by the heating element. Further, the system of said patent requires careful material selection such that the coefficients of the expansion of the heating element and web are as compatible as possible to minimize the forces generated upon heating of the heating element and expansion of the heating element and web.

SUMMARY OF THE INVENTION

The present invention provides in apparatus for joining heat bondable materials by the application of heat and pressure along a predetermined seam area by means of a flexible diaphragm pressed by fluid pressure which flexes its material engaging side convexly against the materials, the diaphragm comprising a web carrying permanently bonded thereto on its non-material pressing side a flexible heating element having a different coefficient of expansion from that of the web and adapted to apply heat through the web to the area while the diaphragm is so pressed, the improvement for minimizing separation forces between the heating element and the web during heating which comprises providing the heating element with a configuration such that portions thereof extend in directions transverse to that of the seam and other portions extend in the seam direction. Preferably, such configuration is generally sinuous, the successive curves of which are semi-circular; the heating element comprises an electrically conductive flexible ribbon having a portion bonded to the web in the predetermined seam area whch its ends projecting away from the surface of said web; and the projecting ends comprise flexible leads for connection to a source of electrical power.

DESCRIPTION OF PREFERRED EMBODIMENT

Figure 1:
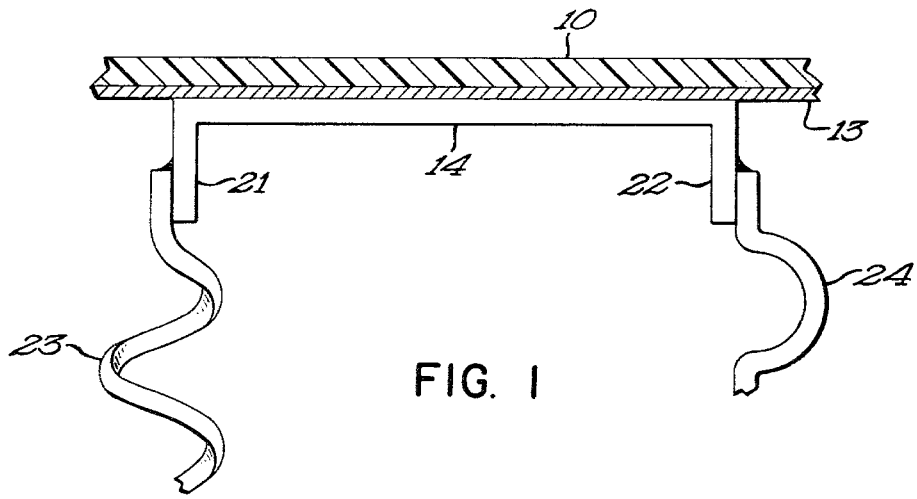
FIG. 1 illustrates a preferred form of electrical connection to the heating element forming a portion of the present invention.

Referring to FIG. 1, there is illustrated a preferred system for making electrical contact with a heating element bonded to a web as illustrated in said patent. The diaphragm of FIG. 1 is formed of a web 10 having a heating element whose central portion 14 is bonded to the web on the side of the web which faces into the cavity, i.e. the non-material engaging side, on assembly of the pressure chamber, by a bonding material 13. The ends 21 and 22 of the heating element are not bonded to the base 10, but instead, extend away from the base 10 in the general direction of the cavity interior. Electrical connection between the heating element and a source of power (not shown) is greatly facilitated by these extensions 21 and 22. Additionally, the fact that electrical communication with the heating element is accomplished at a location where the heating element is not bonded to the base 10 preserves the heat pattern generated by the heating element portion 14. That is, if electrical communication with the heating element were established at a location where it were bonded to the base 10, the increased mass of the heated material at that location would result in a distorted heat pattern generated from that location. Preferably, connection to the ends 21 and 22 of heating element are made by flexible leads to facilitate movement of the flexible diaphragm 10 and reduce the forces imparted to the heating element by the leads. Two such flexible leads are illustrated in FIG. 1, lead 23 being formed as a helical coil, while lead 24 is formed with a curvature therein, both leads 23 and 24 acting as a spring and being secured to the tabs 21 and 22 in any convenient manner, as by welding or soldering.

Figure 2:
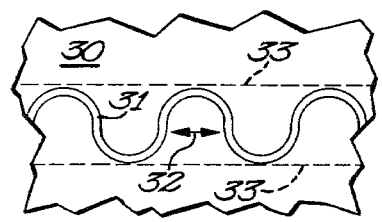
FIG. 2 illustrates a preferred heating element configuration.

As discussed above, the use of a heating element bonded to a flexible web, each having a different coefficient of expansion, results in forces tending to sever the bond when the heating element is brought up to temperature. FIG. 2 illustrates a heating element/flexible web combination which reduces these forces. In FIG. 2, a flexible web 30 is illustrated having a heating element 31 bonded thereto in any convenient manner. The direction of the desired bond configuration is illustrated by the arrow 32. For example, assuming it is desired to produce a seam between the right and left edges of the flexible web 30 illustrated in FIG. 2 in the area between the phantom lines 33 (i.e., in the direction of arrow 32) the heating element 31 extends in the direction of the desired seam area in non-linear manner relative to the desired seam area. That is, the heating element 31 has portions which extend in a direction transverse to the direction of the desired seam configuration.

As illustrated in FIG. 2 heating element 31 is formed as a series of semi-circles. Any configuration having portions which extend in directions transverse to the direction of the desired seam configuration will have the result of minimizing the separation forces between the heating element 31 and web 30. The configuration of the heating element 31 need not be symmetrical or circular, although the circular configuration illustrated in FIG. 2 has the advantage of having a heating element expansion perpendicular to the direction of the desired seam configuration equal to the expansion in the direction of the desired seam configuration, thereby minimizing both.

Figure 3:
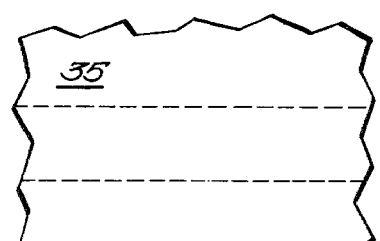
FIG. 3 illustrates the bond pattern produced by a heating element configured in accordance with FIG. 2.
Figure 4:
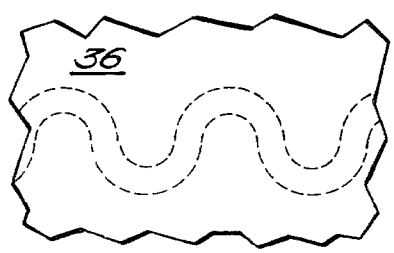
FIG. 4 illustrates an alternative bond pattern to that of FIG. 3 resulting from the heating element configuration of FIG. 2.

With the heating element of FIG. 2, the radius of the semicircles will determine the ultimate bond configuration. FIGS. 3 and 4 show bonded materials 35 and 36 with the bond being illustrated in phantom. With a small radius, a bond having generally parallel sides, as illustrated in phantom in FIG. 3, will result. With a larger radius, the edges of the bond area will tend to follow the heating element configuration resulting in a wavy bond as illustrated in FIG. 4.

Modifications and variations of the present invention are possible in light of the above teachings. Accordingly, it is to be understood, that within the scope of the appended claims, the invention may be practiced otherwise than as specifically described.

I claim:

1. In apparatus for joining heat bondable materials by the application of heat and pressure along a predetermined seam area by means of a flexible diaphragm one side of which is pressed by fluid pressure which flexes its material engaging side convexly against the materials, said diaphragm comprising a web carrying permanently bonded thereto on its non-material pressing side a flexible heating element having a different coefficient of expansion from that of the web and adapted to apply heat through the web to said area while the diaphragm is so pressed, the improvement for minimizing separation forces between the heating element and the web during heating and for minimizing the mass of said element for quick heating and cooling wherein said flexible heating element comprises a thin ribbon bonded to said web along only a portion of its length so as to terminate in outwardly turned portions comprising flexible tabs extending away from the plane of the web for connection to a source of electrical power at locations remote from the area wherein said ribbon is bonded to said web whereby the mass of heating element in contact with said web remains unchanged throughout its length, said improvement further comprising spring-like leads connected to said tabs permitting said diaphragm to flex in operation in a direction normal to its plane while minimizing separation forces imparted to said ribbon by the leads.

2. The improvement as claimed in claim 1 which comprises providing said heating element with a configuration such that portions thereof extend in directions transverse to that of the seam and other portions extend in the seam direction.

3. The improvement as claimed in claim 2 wherein said configuration is generally sinuous, the successive curves of which are semi-circular.

* * * * *